Patented Nov. 10, 1931

1,831,419

UNITED STATES PATENT OFFICE

JACQUES LEFRANC, OF PARIS, FRANCE, ASSIGNOR, BY MESNE ASSIGNMENTS, TO WM. E. CELESTIN, OF PARIS, FRANCE

PROCESS FOR THE HYDROLYSIS OF CELLULOSIC SUBSTANCES

No Drawing. Application filed January 25, 1927, Serial No. 163,572, and in France May 20, 1926.

One of the most important steps in the transformation of wood into alcohol consists in the saccharification of the cellulose so as to obtain a proportion of sugar which is suitable for the alcoholic fermentation. Within the last few years, the saccharification has generally been effected by the sulphuric acid method.

The actions which take place in the saccharification of wood are of a most complex nature; on the one hand the formation of the fermentable sugars is limited by a reverse destructive action, and, on the other hand, the output of alcohol is always below the theoretical amount, due to the fact that, among the reducing sugars which are detected with the Fehling's solution, the hexoses alone are susceptible of alcoholic decomposition by yeast, to the exclusion of the pentoses, among others.

In the case of the butyric fermentation, the conditions to be realized are different from those required in manufacturing alcohol from wood. It is no longer essential to produce hexoses, but the process should tend to the extraction, from the cellulose or the hydrocarbonated substances which are not susceptible of an immediate diastasic decomposition, of the greatest possible amount of soluble hydrates of carbon, either hexoses, or pentoses, or hydro-celluloses or the like, i. e., either reducing or non-reducing substances in presence of copper liquor, such as dextrine.

In fact, the distintegration of the cellulose in nature is usually of a bacterial origin, and takes place chiefly at the extreme ends of the processes of distintegration by fermentation, and chiefly butyric fermentation caused by the very powerful symbiotic action of a complex aggregate of bacteria, extending from the putrificus type, to the butyric bacilli, the latter representing generic types of the anaerobic class, upon the material which has been rendered soluble by a complex mechanism of biochemical phenomena.

To extract from wood, for example, the maximum amount of soluble substances which are adapted for butyric fermentation under the proper conditions—either by pure bacteria or by symbiosis—the new process in accordance with the present invention essentially consists in the slow and regulated action of sulphuric acid or a bisulphate such as sodium bisulphate, in predetermined conditions of temperature and concentration; the treatment may comprise as a further step the action, in the hot state and under pressure, of hydrofluoric acid formed in situ, whose hydrolyzing action is comparable with that of hydrochloric acid, if not greater, and which offers an advantage over the latter from the fact that it can be readily eliminated by precipitation as the calcium salt.

The wood which is employed as a source of cellulose, which is in the suitably powdered state, for instance as sawdust, is treated with an equal weight of 10 per cent sulphuric acid the wood being supposed in the dry state. The paste, which is made quite homogeneous by working it up, is subjected to a partial drying at 100–120 degrees C. by which its percentage of water is reduced to 50–60 per cent in 2 to 3 hours. During this drying, the mass should be stirred in order to prevent local overheating.

To further the action of this prepa atory hydrolysis treatment, and to continue as far as possible the hydrolysis of the cellulose without occasioning a reverse destructive reaction, the mass which results from the preliminary drying is placed in a digester which is provided with the proper stirring means; an alkali or an alkali-earth or an earth metal fluoride or cryolite, or even a hydrated fluoride of aluminium (but preferably calcium fluoride in the form of fluorspar) is then added to the mass in such quantity that the free sulphuric acid contained in the mass shall be precipitated by the metal of the fluoride, for example by the calcium, thus forming in the mass a corresponding amount of hydrofluoric acid in the nascent state.

By way of example, the proportions of the reagent per 100 parts of dry wood may be as follows: pure sulphuric acid ($SO_4H_2$) 9.8 parts, $CaF_2$ 7.8 parts (representing 3.8 parts of hyrofluoric acid).

According to circumstances, and, for instance, according to the quality of the cellulose or the kind of wood treated, the addition of the fluoride may be such as to preserve more or less of the sulphuric acid in the free state whereby the material will be subjected to the combined action of sulphuric acid and hydrofluoric acid, with the optional addition of sodium bisulphate.

The amount of hydrofluoric acid in use may be further increased by adding dilute sulphuric acid and a further amount of fluoride to the material in the digester.

In the digester, the temperature is raised to 120–130 degrees C. i. e. at 2 to 3 atmospheres pressure for 2 to 3 hours by means of steam. When the operation is completed, the pressure is reduced, with the optional recovery of the hydrofluoric acid which escapes with the expanding steam. At the discharge end of the digester, the mass is collected in a mixing vessel, and an accurately proportioned amount of milk of lime or calcium carbonate in the form of chalk or of sugar skimmings that is the residue separated by filtration after the calcic purification of sugar juice or after the treatment by carbon dioxide of the limed juice; chemically, such skimmings are constituted by calcium carbonate containing all the organic impurities of the sugar juice, is added to the mass, so as to neutralize the acidity and precipitate the hydro-fluoric acid. From the mass which is thus properly neutralized, the soluble elements will be extracted by lixiviation, for instance by diffusion or centrifugal treatment.

In these conditions and according to the nature of the wood and the proportion of insoluble substances, there will be extracted hydrates of carbon such as hexoses, pentoses, hydro-celluloses, dextrines and others; these substances may be decomposed into aliphatic acids by butyric fermentation, either pure or symbiotic, with an output of 40–45 per cent or more soluble substances counted as glucose.

Having now described my invention, what I claim as new and desire to secure by Letters Patent is:

1. A process of hydrolysis of cellulose material for the production of a fermentable liquid which comprises mixing the powdered cellulose material with a solution of sulphuric acid, stirring the paste thus obtained, drying until the water content is reduced to about 50–60%, in neutralizing the acid present in the liquid and lixiviating the soluble hydrolized products.

2. In a process of hydrolysis of a cellulosic material the step of subjecting the partially hydrolized mass to the action of hydrofluoric acid.

3. In the process of hydrolysis of cellulosic material by means of sulphuric acid, the step of adding a fluoride adapted to be decomposed by the sulphuric acid and to produce hydrofluoric acid.

4. In the process of hydrolysis of cellulosic material by means of sulphuric acid, the step of adding calcium fluoride adapted to be decomposed by the sulphuric acid and to produce hydrofluoric acid.

5. In the process of hydrolysis of cellulosic material by means of sulphuric acid, the step of adding fluorspar adapted to be decomposed by the sulphuric acid and to produce hydrofluoric acid.

6. A process of hydrolysis of cellulose material for the production of a fermentable liquid which comprises subjecting the cellulose material to the moderate action of diluted sulphuric acid and simultaneously partially drying the mass, at about 100–120° C., in transferring the mass into a digester, adding a fluoride and maintaining the temperature at about 120–130° C. and the pressure at about 2 to 3 atmospheres, in neutralizing the acid present in the liquid and lixiviating the soluble hydrolyzed products.

7. In the process of hydrolysis of cellulosic material by means of sulphuric acid, the step of adding a fluoride adapted to be decomposed by the sulphuric acid and to produce hydrofluoric acid, the amount of fluoride being insufficient for completely neutralizing the sulphuric acid.

8. A process of hydrolysis of cellulose material for the production of a fermentable liquid which comprises subjecting the cellulose material to the moderate action of diluted sulphuric acid, and simultaneously partially drying the mass, at about 100–120° C., in neutralizing the acid present in the liquid by means of sugar skimmings and lixiviating the soluble hydrolized products.

In testimony whereof I have signed my name to this specification.

JACQUES LEFRANC.